April 30, 1963   J. J. KERLEY, JR   3,087,313
ISOLATOR TYPE SHAFT COUPLING DEVICES
Filed Dec. 8, 1959   4 Sheets-Sheet 1
FIG. 1.
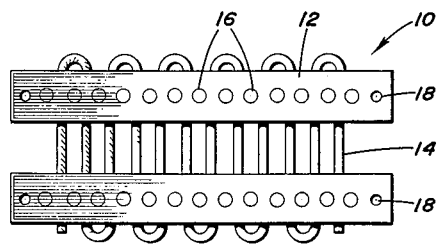
FIG. 2.
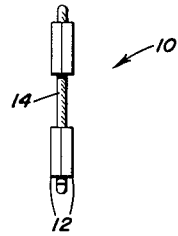
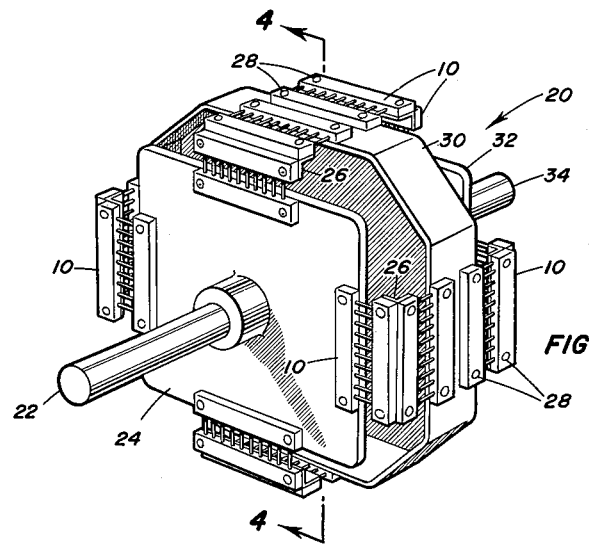
FIG. 3.
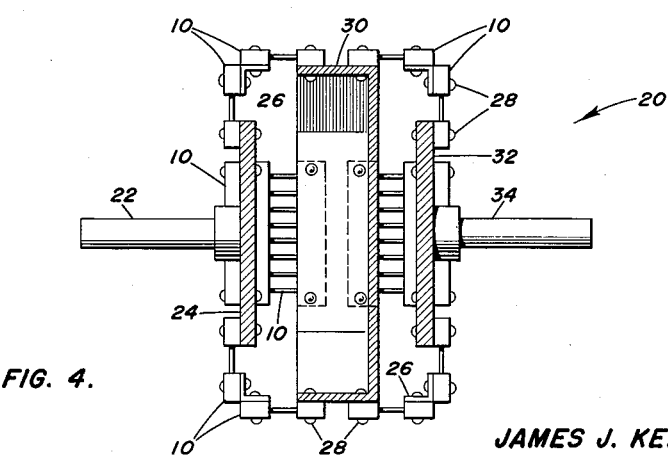
FIG. 4.
JAMES J. KERLEY, JR.
INVENTOR.
BY  Walter G. Finch
ATTORNEY April 30, 1963   J. J. KERLEY, JR   3,087,313
ISOLATOR TYPE SHAFT COUPLING DEVICES
Filed Dec. 8, 1959   4 Sheets-Sheet 2

JAMES J. KERLEY, JR.
INVENTOR.

BY *Walter G. Finch*
ATTORNEY

April 30, 1963 J. J. KERLEY, JR 3,087,313
ISOLATOR TYPE SHAFT COUPLING DEVICES
Filed Dec. 8, 1959 4 Sheets-Sheet 3

JAMES J. KERLEY, JR.
INVENTOR.

BY Walter G. Finch
ATTORNEY

April 30, 1963    J. J. KERLEY, JR    3,087,313
ISOLATOR TYPE SHAFT COUPLING DEVICES
Filed Dec. 8, 1959    4 Sheets-Sheet 4

JAMES J. KERLEY, JR.
INVENTOR.

BY Walter G. Finch
ATTORNEY

United States Patent Office 3,087,313
Patented Apr. 30, 1963

3,087,313
ISOLATOR TYPE SHAFT COUPLING DEVICES
James J. Kerley, Jr., Cheverly, Md., assignor to Kerley Engineering, Inc., College Park, Md., a corporation of Maryland
Filed Dec. 8, 1959, Ser. No. 858,127
13 Claims. (Cl. 64—12)

This invention relates generally to shaft coupling devices, and more particularly it pertains to improvements in shock, vibration, and noise isolating torque coupling arrangements for connecting rotating shafts together.

Multi-strand cable can be made to be very resilient by suitable choice of material, temper, number, and fineness of strands and arrangement and degree of twist. The tensile strength of such cable is great for its diameter which makes its use ideal where severe shock and vibration loads are encountered. By receiving a cable back and forth between driving and driven manners, a practically endless flexible coupling arrangement is provided therebetween which is limited in strength only by the degree of securement at the loops of cable.

It is, therefore, an object of this invention to provide rotary shaft coupling arrangement which will isolate shock and vibration forces in the presence of high steady state or impulse loads at high or low extremes of temperature, in the presence of grease, dirt or high radiation energy without suffering deterioration of function.

Another object of this invention is to provide high strength, compact, flexible heat, and oil resistant rotary type of shock and vibration coupling arrangements for misaligned torque driving and driven shafts.

Other objects of this invention are to provide isolator type shaft coupling arrangements which are economical to manufacture, efficient and reliable in operational use, and which are easy to install and maintain.

These and other objects and attendant advantages of this invention will become more readily apparent and understood from the following detailed specification and accompanying drawings in which:

FIG. 1 is a plan view of a cable type shock and vibration isolator;

FIG. 2 is an end view of the shock and vibration isolator illustrated in FIG. 1;

FIG. 3 is a perspective view of a shock and vibration shaft coupling arrangement incorporating features of the present invention;

FIG. 4 is a cross section taken along line 4—4 of FIG. 3;

Figure 12:
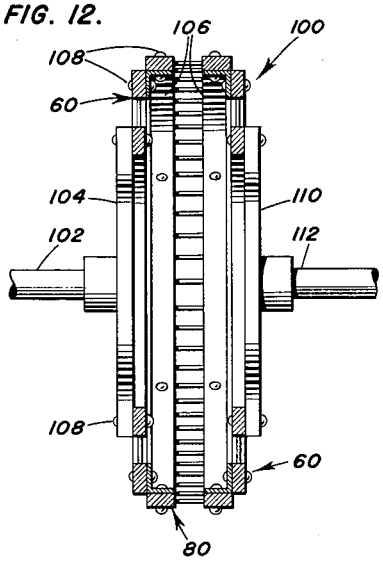
FIG. 12 is a side view, partly in section, showing the assembled shaft coupling arrangement of FIG. 11.
Figure 14:
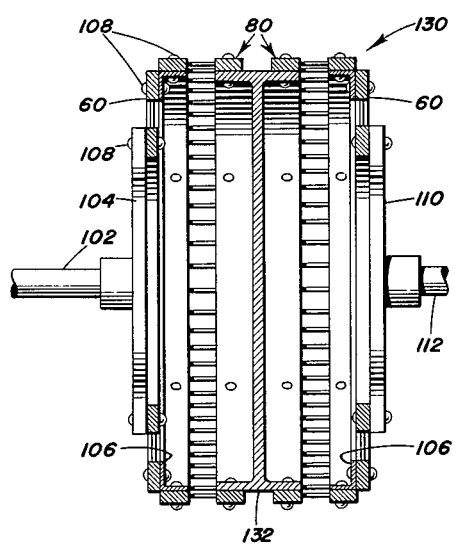
Figure 15:
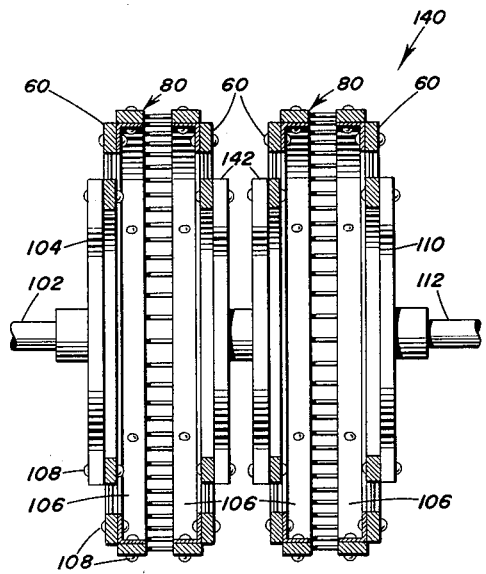

FIG. 14 depicts, in partial cross section, a modification of cylindrical and radial type shock and vibration isolator equipped shaft coupling arrangement which uses a pair of cylindrical type isolators in tandem; and FIG. 15 is a side view, partly in cross section, of a shaft coupling arrangement including a pair of elements similar to the coupling arrangement of FIG. 12 joined in tandem by intermediate coupling plates.

Referring now to the details of the drawings in FIGS. 1 and 2, there is shown a cable type shock and vibration isolator 10. Isolator 10 consists generally of a plurality of passes of resilient multi-strand cable 14 extending between two pairs of comb strips 12. The comb strips 12 are preferably secured together in pairs by means of rivets 16 interspaced with the passes of cable 14.

The resulting isolator 10 can be secured to structure by mounting holes 18 and made to have any degree of flexibility and absorption, any desired frequency of anti-resonance, and any distribution of load support and strength as pointed out in a co-pending application of applicant's filed jointly with Raymond G. Hartenstein and Robert F. Cecce, on June 26, 1958, Serial Number 744,787, now Patent No. 3,026, 259, for "Vibration Isolator Mount."

Possessing the qualities of heat and oil resistance and being practically indestructible, a shock and vibration isolator 10 can be effectively and efficiently used as an adjunct to machinery.

As shown in FIGS. 3 and 4, there is illustrated a shaft shock and vibration coupling arrangement 20, which transmits rotary motion from a driving shaft 22 to a driven shaft 34 through the intermediary of a plurality of the previously mentioned shock and vibration isolators 10.

The driving shaft 22 is secured to a drive plate 24, and similarly the driven shaft 34 is secured to a driven plate 32. Rivets 28 are used to secure the isolators 10 near the edges of the plates 24 and 32 in outwardly extending relationship to the shafts 22 and 34. Coupling angles 26 join each isolator 10 to another isolator 10 at right angles thereto. These angle-supported isolators 10, in turn, are each secured to a floating pan-like structure or box 30 to complete the shaft coupling arrangement 20.

Figure 5:
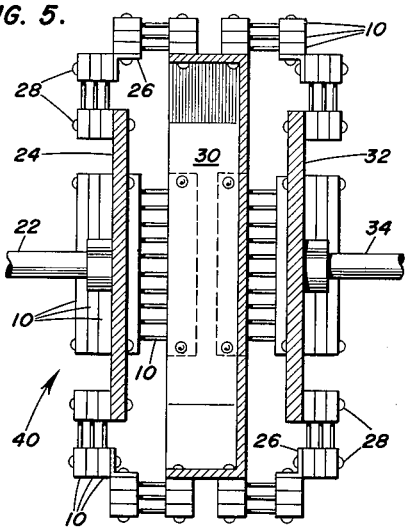
FIG. 5 is a cross section similar to that of FIG. 4 of a modified shaft coupling arrangement employing shock and vibration isolators in parallel.
Figure 6:
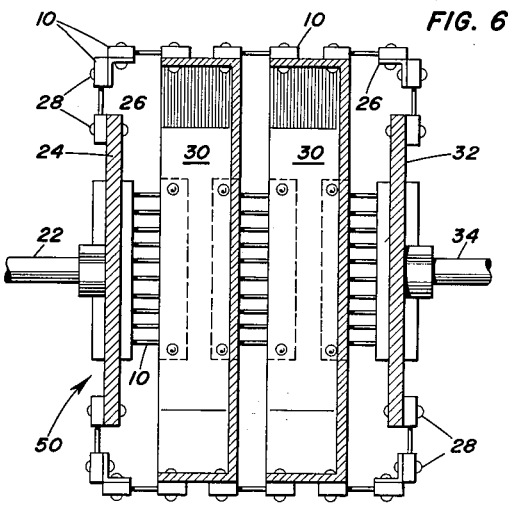
FIG. 6 is a cross section of still another modified coupling arrangement corresponding to that of FIG. 4 in which shock and vibration isolators are used in tandem.

FIG. 5 shows a modified shock and vibration coupling arrangement 40 which employs a plurality of isolators 10 mounted in parallel. FIG. 6, on the other hand, depicts a shock and vibration coupling arrangement 50 which employs isolators 10 in tandem. These two modifications of the coupling arrangement 20 of FIG. 4 illustrate the ease of adaption of the arrangement for various degrees of strength or flexibility to suit service conditions.

Figure 7:
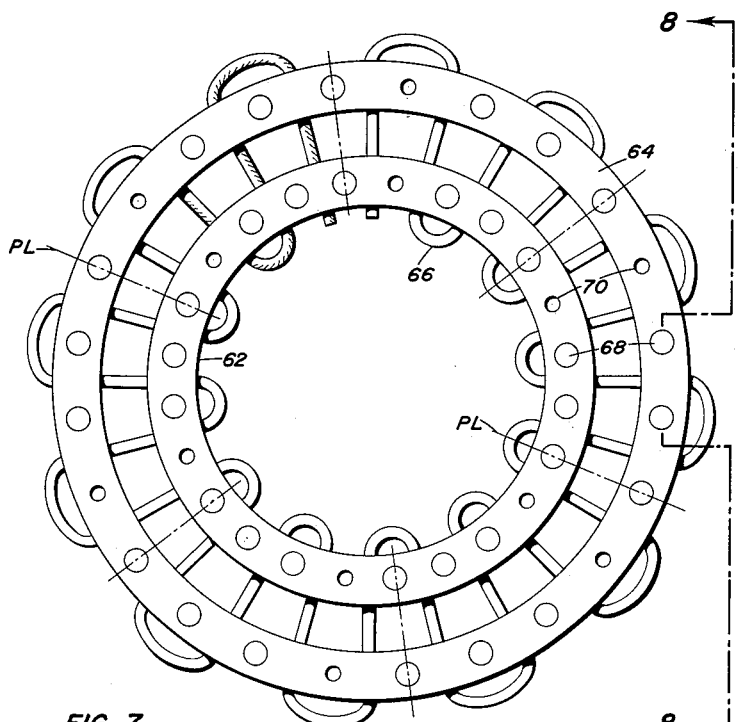
FIG. 7 is a plan view of a novel radial type shock and vibration isolator, with dot-dash lines indicating how the isolator segments may be cut therefrom.
Figure 8:
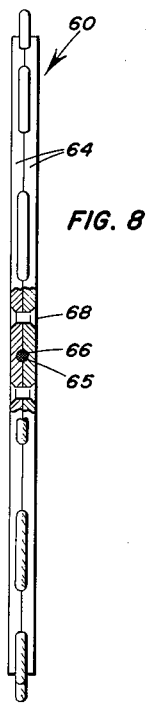
FIG. 8 is a side view, partly in cross section taken along the line 8—8 of FIG. 7 of the radial type shock and vibration type isolator.

A radial shock and vibration isolator 60, as shown in FIGS. 7 and 8, employs radial reeving of a resilient multi-strand cable 66 as previously described. A pair of inner rings 62, and a pair of outer rings 64, both having semi-circular mating grooves 65, receive the multi-passes of resilient cable 66. Spaced rivets 68 fasten each pair of mating rings 62 and 64 together, and mounting holes 70 are provided in the rings 62 and 64 at spaced intervals. If desired, the radial shock and vibration isolator 60 may be segments by division along the dot-dashed lines PL for use where a complete circular isolator 60 is not convenient.

Figure 9:
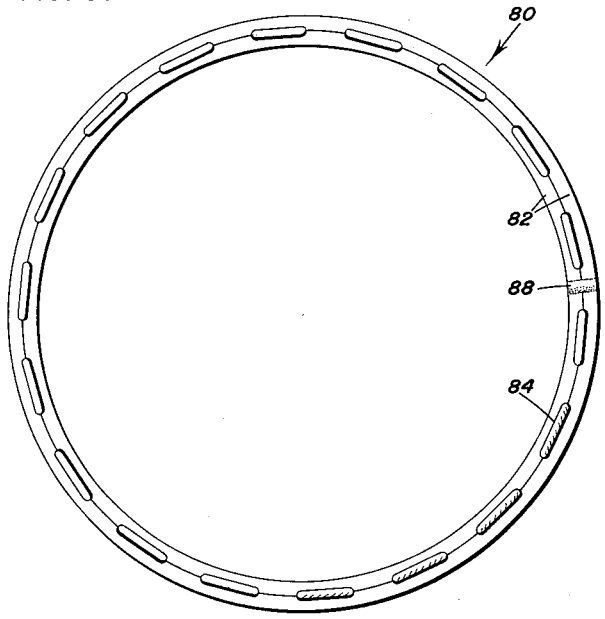
FIG. 9 is an end view of a novel cylindrical type shock and vibration isolator.
Figure 10:
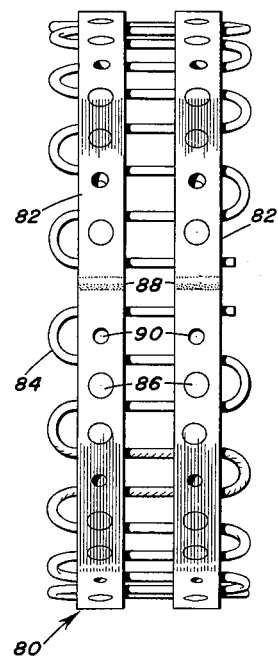
FIG. 10 is a side view of a cylindrical type shock and vibration type isolator such as that illustrated in FIG. 9.

A design for a cylindrical type shock and vibration isolator 80 is shown in FIGS. 9 and 10. This isolator 80 is most readily fabricated from notched straps 82 fastened together in pairs by rivets 86. A multi-strand resilient cable 84 is reeved between the pairs of straps 82, which are then formed into a closed ring and secured with welded ends 88. Mounting holes 90 are provided in the isolator 80 by omitting rivets 86 at spaced intervals.

Figure 11:
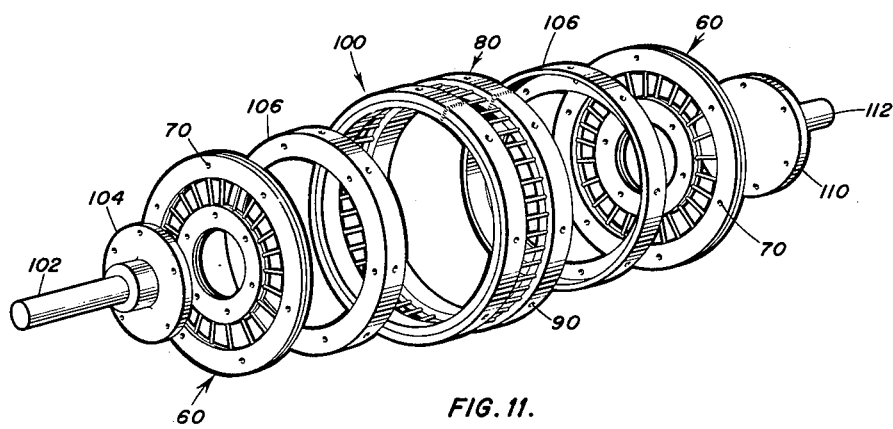
FIG. 11 is an exploded, perspective view of a shaft coupling arrangement employing a cylindrical type of shock and vibration isolator in combination with radial type shock and vibration isolators.

A novel shaft shock and vibration coupling arrangement 100 having great strength, compactness, and superior shock and vibration isolating qualities is provided by combining the radial and cylindrical isolators 60 and 80, as shown in FIGS. 11 and 12. A driving shaft 112 is secured to a driven flange or plate 110. By means of fasteners 108, each plate 104 and 110 is attached to a radial type isolator 60. The radial type isolators 60, in turn, are attached to a common cylindrical isolator 80 located between them with a pair of coupling rings 106 and additional fasteners 108.

Figure 13:
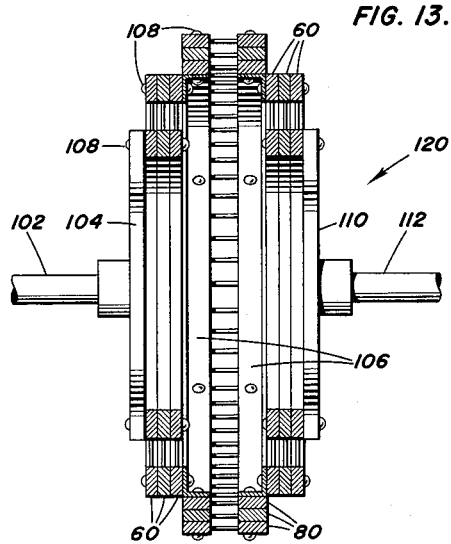
FIG. 13 is a side view, partly in section, of a modified cylindrical type shock and vibration isolator equipped shaft coupling arrangement which uses radial type shock and vibration isolators in parallel.

The resulting coupling arrangement 100 is readily adapted to a modified shaft coupling arrangement 120 shown in FIG. 13 where a plurality of radial type isolators 60 are stacked in parallel assembly.

A shaft coupling arrangement 130, also derived from the coupling arrangement 100, is shown in FIG. 14. Instead of using only one cylindrical isolator 80 in the assembly, as depicted in FIG. 12, two are used in the design of coupling arrangement 30. The two isolators 80 are joined in series by means of a double flanged plate 132 therebetween.

If still further isolation from shock and vibration forces is required, a coupling arrangement 140, shown in FIG. 15, is effective. It will be recognized that this design, in essence, consists of a tandem of two coupling arrangements similar to coupling arrangement 100, shown in FIG. 12. An intermediate set of joined coupling plates 142 is required.

Obviously many modifications and variations of the present invention are possible in light of the above teachings. It is, therefore, to be understood that within the scope of the appended claims the invention may be practiced otherwise than as specifically described.

What is claimed is:

1. A power transmission arrangement for isolating spaced members from shock and vibration forces transmitted to either member, comprising a driving member, a driven member, and elongated multistrand resilient cable means extended from portions of each of said members, the cable means extended from the driving member extending in a plane transverse in relation to the plane of the cable means extended from the driven member and means mechanically connecting the transversely extending cable means together remotely from both members, whereby cable tension is relieved during power transmission.

2. A power transmission arrangement for isolating spaced members from shock and vibration forces transmitted to either member, comprising a rotatable driving member, a rotatable driven member, and elongated multistrand resilient cable means extended from portions of each of said members, the cable means extended from the driving member extending in a plane transverse in relation to the plane of the cable means extended from the driven member and means mechanically connecting the transversely extending cable means together remotely from both members, whereby cable tension is relieved during power transmission.

3. A coupling arrangement for isolating spaced members from shock and vibration forces transmitted to either member, comprising, a driving member having a plate on one end thereof, a driven member having a plate on its end thereof adjacent said driven member, a pan-like structure positioned intermediately said plate, and a plurality of spaced cable type isolator means mechanically coupled between each plate to said pan-like structure to transmit power between said members but arranged to isolate one of said members from shock and vibration forces transmitted to the other of said members.

4. A power transmission arrangement for isolating spaced members from shock and vibration forces transmitted to either member, comprising driving means having a plate on one end thereof, driven means having a plate on its end adjacent said driving means, structure positioned intermediately of said plates, multistrand resilient cable means affixed to each plate in a predetermined angular orientation, and resilient means connecting the cable means remotely of both plates to said intermediate structure to relieve cable tension during power transmission.

5. A power transmission arrangement for isolating spaced members from shock and vibration forces transmitted to either member, comprising rotatable driving means having a plate on one end thereof, rotatable driven means having a plate on its end adjacent said driving means, structure positioned intermediately of said plates, multistrand resilient cable means affixed to each plate in a predetermined angular orientation, and resilient means connecting the cable means remotely of both plates to said intermediate structure to relieve cable tension during power transmission.

6. A coupling arrangement for isolating spaced members from shock and vibration forces transmitted to either member, comprising, a driving member having a plate on one end thereof, a driven member having a plate on its end adjacent said driving member, structure positioned intermediately of said plates, and a plurality of serially coupled cable type isolator arrangements peripherally arranged and connected between each plate and said structure for transmitting power between said members but arranged to isolate said members from shock and vibration forces transmitted to either of said members.

7. A coupling arrangement as recited in claim 6, wherein each serially coupled cable type isolator arrangement consists of a pair of isolators, with one isolator of each isolator arrangement being arranged substantially transversely to the other isolator thereof.

8. An arrangement for isolating spaced members from shock and vibration forces transmitted to either member, comprising, a driving member having a plate on one end thereof, a driven member having a plate on its end thereof adjacent said driven member, and a coupling arrangement positioned intermediately said plates, said coupling arrangement consisting of a cylindrical type shock and vibration isolator, and a radial type shock and vibration isolator connected at each end thereto, each said radial type shock and vibration isolator being coupled mechanically to its corresponding plate.

9. An arrangement as recited in claim 8, wherein a plurality of radial type isolators are stacked in a parallel assembly at each end of said cylindrical type isolator.

10. An arrangement as recited in claim 8, wherein a plurality of cylindrical type isolators are joined in series between said pair of radial type isolators.

11. An arrangement as recited in claim 8, wherein a plurality of radial type isolators and a plurality of cylindrical type isolators are provided, with said radial type isolators stacked in a parallel assembly at opposite ends of said cylindrical type isolators and said cylindrical type isolators are joined in series between said stacked radial type isolator assemblies.

12. An arrangement as recited in claim 8, wherein a plurality of concentric cylindrical type isolators are provided in series between said pair of radial type isolators.

13. An arrangement as recited in claim 12, wherein a plurality of radial type isolators are stacked in parallel assembly at opposite ends of said concentric cylindrical type isolators.

References Cited in the file of this patent

UNITED STATES PATENTS

| | | |
|---|---|---|
| 732,079 | Hunt | June 30, 1903 |
| 1,602,912 | Leipert | Oct. 12, 1926 |
| 1,657,844 | Smith | Jan. 31, 1928 |
| 1,672,398 | Treschow | June 5, 1928 |
| 2,873,109 | Hartenstein et al. | Feb. 10, 1959 |

FOREIGN PATENTS

| | | |
|---|---|---|
| 328,021 | Great Britain | Apr. 16, 1930 |